…

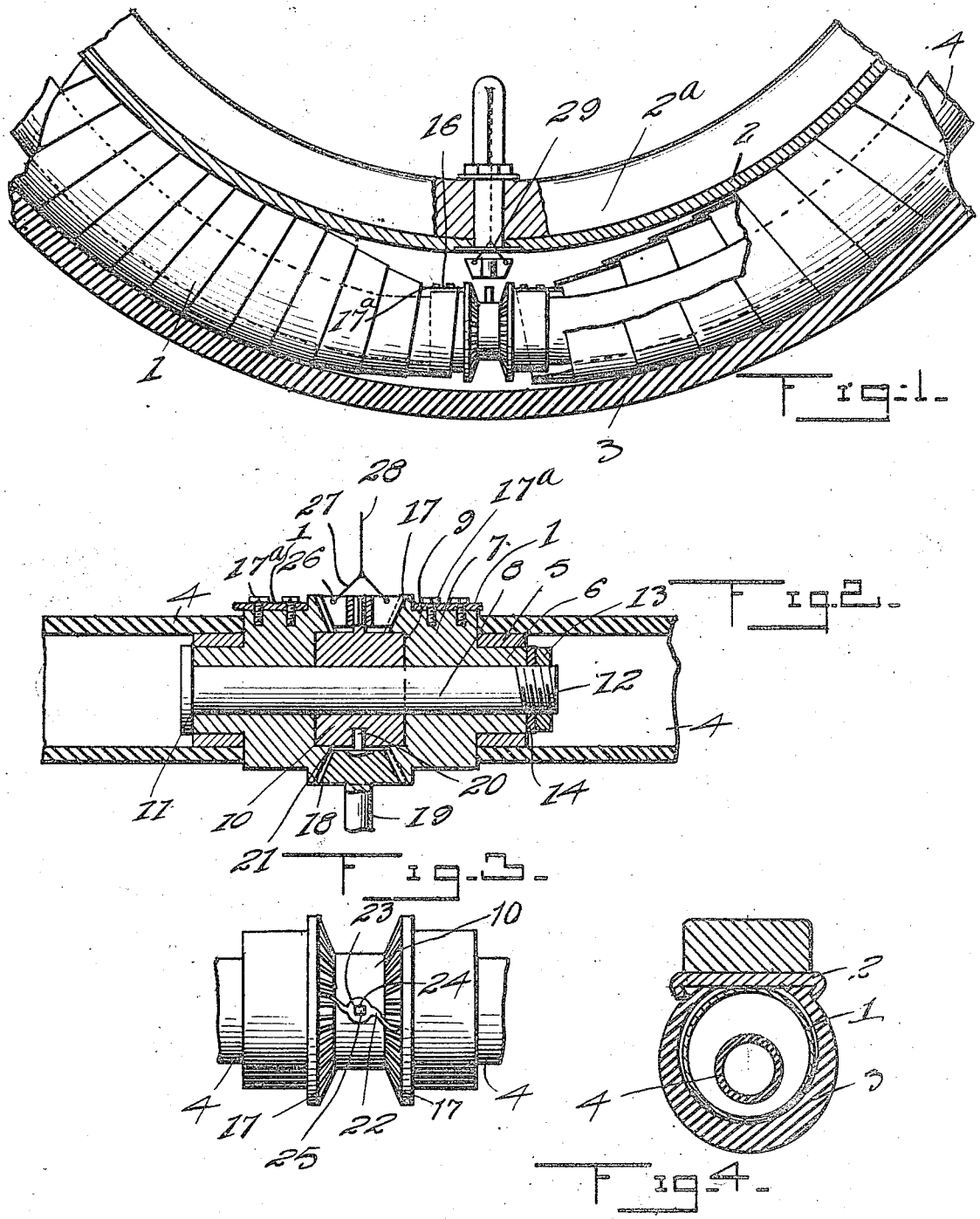

UNITED STATES PATENT OFFICE.

CYRUS S. WERT, OF KENDALLVILLE, INDIANA.

INNER TUBE FOR AUTOMOBILE-TIRES.

1,199,644.

Specification of Letters Patent. Patented Sept. 26, 1916.

Application filed April 24, 1915. Serial No. 23,695.

*To all whom it may concern:*

Be it known that I, CYRUS S. WERT, a citizen of the United States, residing at Kendallville, in the county of Noble and State of Indiana, have invented certain new and useful Improvements in Inner Tubes for Automobile-Tires; and I do hereby declare the following to be a full, clear, and exact description of the invention, such as will enable others skilled in the art to which it appertains to make and use the same.

The invention relates to an inner tube for automobile and other motor vehicle tires.

The object of the present invention is to improve the construction of inner tubes for automobiles and various other vehicles and to provide a simple, practical and resilient cushioning device designed to be substituted for an ordinary inflatable inner tube and capable of affording the resiliency of the same and at the same time provide a strong and durable construction, not subject to puncture and adapted also to be readily placed on and removed from a vehicle wheel.

A further object of the invention is to provide an inner continuous or practically continuous spirally coiled spring adapted to be collapsed and maintained in a tight or wound condition to enable it to be readily introduced into an outer tube or shoe and capable after being placed in the same and arranged on the rim of a wheel of being released and of expanding automatically and filling and yieldably supporting the said outer tube or shoe.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing Figure 1 is a longitudinal sectional view of a portion of a tire provided with an inner tube constructed in accordance with this invention, Fig. 2 is an enlarged detail sectional view taken longitudinally through the means for connecting and winding the coiled spring, Fig. 3 is a plan view of the same, Fig. 4 is a transverse sectional view through the tire and the rim.

Like numerals of reference designate corresponding parts in the several views of the drawing.

In the accompanying drawing in which is illustrated the preferred embodiment of the invention, the inner tube comprises in its construction a spirally coiled spring 1 which in a relatively small wheel may extend entirely around the rim 2 mounted on a felly 2ª but in the larger class of wheels the inner tubes may consist of a plurality of spirally coiled springs 1 extending partially around the wheel and connected at their terminals by the means hereinafter described for winding the springs and for maintaining them in a collapsed or wound condition to enable them to be readily introduced into or removed from an outer tube 3. The spring 1 consists of a narrow strip of resilient spring steel or other suitable material and it may be of any width and thickness to provide an inner tube or cushion of the required size and strength and the coils or convolutions are arranged in overlapping relation and are adapted to slide on each other to permit the spring to be wound and contracted and reduced in diameter to facilitate its ready introduction into the outer tube. By varying the size of the flat strip constituting the spiral spring, a tire of any strength and size may be constructed.

In the manufacture of the device the circumferentially arranged spirally wound cushioning spring is mounted on an inner core 4, constructed of tubular elastic material and preferably consisting of a rubber hose or tube which enables the spring to be readily wound and maintain the coils or convolutions in proper relation and prevents the spring from twisting, kinking or otherwise getting out of true shape. The tubular elastic core which is designed to extend entirely around the wheel when the circumferential cushioning spring is continuous may be also made in section like the spring when the device is designed for use on the larger class of wheels and the said core is provided at its ends with interior metallic bushings 5 suitably secured within the ends of the core and loosely arranged on and forming bearings for reduced portions 6 of gears 7. The gears 7 which are mounted on a connecting bolt 8 are provided in their inner opposed faces with annular recesses 9 receiving a spacing sleeve 10 which is also mounted on the connecting bolt 8. The connecting bolt which constitutes a shaft or spindle for the gear wheels 7 is provided at one end with a head 11 and its other end 12 which is threaded receives a nut 13 and a washer 14 is interposed between the nut 13 and the adjacent reduced portion 6 of the rotary element or gear 7.

The terminals 16 of the spring are secured by screws 17ª or other suitable fastening means to the rotary element or gear wheel 7 at the periphery thereof and the said gear wheels are provided at their inner opposed faces adjacent to the outer walls of the recesses 9 with beveled spur teeth 17 which are adapted to mesh with a spur pinion 18 of an operating device 19. The pinion 18 is provided at its center with a projecting journal 20 which fits in a socket or bearing 21 in one side of the spacing sleeve 10 and the operating device may be rotated in any desired manner to impart reverse rotary movement to the gear wheels whereby one terminal of the spiral spring will be turned or wound to the right and the other to the left to wind or tighten the spring throughout the entire length thereof and thereby reduce the diameter of the spring. The spiral spring is wound and reduced to the required diameter before it is applied to the outer tube and before the outer tube is arranged on the rim of the wheel and in order to retain the spiral spring in its wound condition the gear wheels are locked against rotary movement by a double pawl or dog 22, consisting of oppositely disposed arms extending from a central hub 23 which is provided with an opening 24 for the reception of a pivot, stud or projection 25 extending from the spacing sleeve preferably at a point diametrically opposite the bearing socket 21. The arms of the dog or pawl by engaging in the recesses between the spur teeth are adapted to lock the gears or rotary elements against rotation.

The pawl or dog 22 is provided at spaced points with perforations 26 in which are secured branches 27 of a wire 28 or other flexible connection designed to extend through the opening 29 in the rim of the wheel to enable the pawl or dog to be withdrawn from engagement with the teeth of the gear wheels after the outer tube with the device within the same has been assembled in proper position on the wheel. In applying the device to a wheel the operating tool or member 19 is removed from meshing engagement with the gears after the dog has been placed in position. The cushioning device is then arranged within the outer tube and the latter is placed on the wheel, the dog being arranged opposite the opening in the rim and the wire extending through such opening. The wire is then pulled to withdraw the dog from engagement with the teeth of the gear. This will permit the spring to unwind and expand within the outer tube and yieldably support the same in a manner similar to an ordinary inflatable inner tube. When a plurality of winding devices is employed, an opening in the rim of the wheel will of course be provided for each of the said devices. In the winding of the spring to reduce the diameter thereof the gears or members turn within the metal bushings of the elastic core 4 which do not rotate.

As the tire is puncture proof it will be unnecessary to remove the outer tube or shoe until the same is entirely worn out and is in a condition to be completely discarded. When the outer tube or shoe is in this condition it may be opened up by cutting it away to afford access to the gearing and the spring may be then rewound and the pawl or dog engaged with the gears for holding the spring in such condition while the outer tube or shoe is being removed and a new one substituted for the worn out tube or shoe.

It will be seen that the cushioning device is exceedingly simple and inexpensive in construction, that is adapted to eliminate tire troubles caused by punctures and blow outs of the inner tube, that is practically non-breakable and that it is adapted to be readily applied to and removed from a vehicle wheel with greater facility than an ordinary inflatable inner tube.

What is claimed is:—

1. A cushioning device of the class described including a circumferentially arranged spring consisting of a spirally coiled strip of material, and means for winding the strip comprising spaced gears, adapted to be rotated in opposite directions and means for engaging the gears for holding the same against rotary movement to maintain the spring at a reduced diameter to enable the said spring to be introduced into and removed from an outer tube.

2. A cushioning device of the class described including a circumferentially arranged spring consisting of a spirally coiled strip of material, means for winding the strip comprising spaced gears, adapted to be rotated in opposite directions, and a dog interposed between the gears and engaging the teeth thereof to hold the said gears against rotary movement.

3. A cushioning device of the class described including a circumferentially arranged spring consisting of a spirally coiled strip of material, means for winding the strip comprising spaced gears, adapted to be rotated in opposite directions, a dog interposed between the gears and engaging the teeth thereof to hold the said gears against rotary movement, and means connected with the dog for withdrawing the same from engagement with the gears to permit the spring to expand within an outer tube.

4. A cushioning device of the class described including a spirally coiled spring, and means for winding the spring to reduce the diameter thereof for enabling the spring to be readily introduced into and removed from an outer tube, said means comprising spaced gears connected with the terminals of the spring, a sleeve interposed between the gears and provided at one side with a bearing adapted to receive operating means for rotating the gears, said sleeve being also provided with a projecting pivot stud, and a dog removably mounted on the pivot stud and arranged to engage the gears for locking the same against rotary movement.

5. A cushioning device of the class described including a spirally coiled spring, an elastic core arranged within the spring, spaced gears connected with the terminals of the spring and having reduced portions extending into the said core, a pivot connecting the gears, and a sleeve mounted on the pivot and interposed between and spacing the gears, and means mounted on the sleeve for engaging the gears.

6. A cushioning device of the class described including a spirally coiled spring, gears connected with the terminals of the spring, a sleeve interposed between the gears, a bolt connecting the gears and supporting the sleeve, the latter being provided with a projecting stud, a pawl or dog mounted on the stud and engaging the gears and flexible means connected with the pawl or dog and adapted to extend exteriorly of a rim for releasing the gears.

In testimony whereof I affix my signature in presence of two witnesses.

CYRUS S. WERT.

Witnesses:
ANSON KREIGER,
FRANK ADAN.